United States Patent
Abouzied et al.

(10) Patent No.: US 11,112,315 B1
(45) Date of Patent: Sep. 7, 2021

(54) BLENDING TEMPERATURE-DEPENDENT CURRENTS TO GENERATE BIAS CURRENT WITH TEMPERATURE DEPENDENT PROFILE

(71) Applicant: QUALCOMM Incorporated, San Diego, CA (US)

(72) Inventors: Mohamed Abouzied, La Jolla, CA (US); Ibrahim Ramez Chamas, Carlsbad, CA (US); Bhushan Shanti Asuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/897,086

(22) Filed: Jun. 9, 2020

(51) Int. Cl.
  *G05F 3/24* (2006.01)
  *G01K 7/20* (2006.01)
  *G05F 3/22* (2006.01)

(52) U.S. Cl.
  CPC .............. *G01K 7/20* (2013.01); *G05F 3/225* (2013.01)

(58) Field of Classification Search
  None
  See application file for complete search history.

(56) References Cited

U.S. PATENT DOCUMENTS

| | | | |
|---|---|---|---|
| 6,265,857 B1* | 7/2001 | Demsky | G05F 3/245 323/312 |
| 7,768,342 B1* | 8/2010 | McMahill | H03F 1/301 327/538 |
| 8,749,219 B2* | 6/2014 | Kikuchi | G05F 3/26 323/315 |
| 8,896,378 B2 | 11/2014 | Hirose et al. | |
| 9,946,289 B1 | 4/2018 | Lau et al. | |
| 10,151,644 B2 | 12/2018 | Hsu et al. | |
| 10,198,022 B1 | 2/2019 | Far | |
| 2020/0099366 A1 | 3/2020 | Rotzoll et al. | |

* cited by examiner

*Primary Examiner* — Jeffery S Zweizig
(74) *Attorney, Agent, or Firm* — Loza & Loza LLP (57) ABSTRACT

An apparatus for generating a temperature-dependent current. The apparatus includes an input current scaling circuit configured to generate a first current that varies with temperature in accordance with a first programmable slope, and a second current that varies with temperature in accordance with a second programmable slope; and a current temperature blending circuit configured to generate a third current based on the first current over a first temperature range and the second current over a second temperature range, wherein the first temperature range is different than the second temperature range.

30 Claims, 7 Drawing Sheets

BLENDING TEMPERATURE-DEPENDENT CURRENTS TO GENERATE BIAS CURRENT WITH TEMPERATURE DEPENDENT PROFILE

FIELD

Aspects of the present disclosure relate generally to biasing of amplifiers, and in particular, to a method of blending temperature-dependent currents to generate a bias current for an amplifier (or other circuit or device) with a particular temperature-dependent profile.

DESCRIPTION OF RELATED ART

An amplifier is used to amplify an input signal to generate an output signal. A bias current and/or voltage is applied to the amplifier for it to perform its signal amplification operation. The operating characteristics of the amplifier, such as gain, output power, linearity, and other parameters, depend on the bias current or voltage applied to the amplifier. For example, the temperature-dependency of the bias current or voltage may affect the operating characteristics of the amplifier over the amplifier's operating temperature range.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes an input current scaling circuit configured to generate a first current that varies with temperature in accordance with a first programmable slope, and generate a second current that varies with temperature in accordance with a second programmable slope. The apparatus further includes a current temperature blending circuit configured to generate a third current based on the first current over a first temperature range and the second current over a second temperature range, wherein the first temperature range is different than the second temperature range.

Another aspect of the disclosure relates to a method. The method includes generating a first current that varies with temperature in accordance with a first programmable slope, generating a second current that varies with temperature in accordance with a programmable second slope; and generating a third current based on the first current over a first temperature range and the second current over a second temperature range, wherein the first temperature range is different than the second temperature range.

An aspect of the disclosure relates to an apparatus. The apparatus includes means for generating a first current that varies with temperature in accordance with a first programmable slope, means for generating a second current that varies with temperature in accordance with a second programmable slope, and means for generating a third current based on the first current over a first temperature range and the second current over a second temperature range, wherein the first temperature range is different than the second temperature range.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
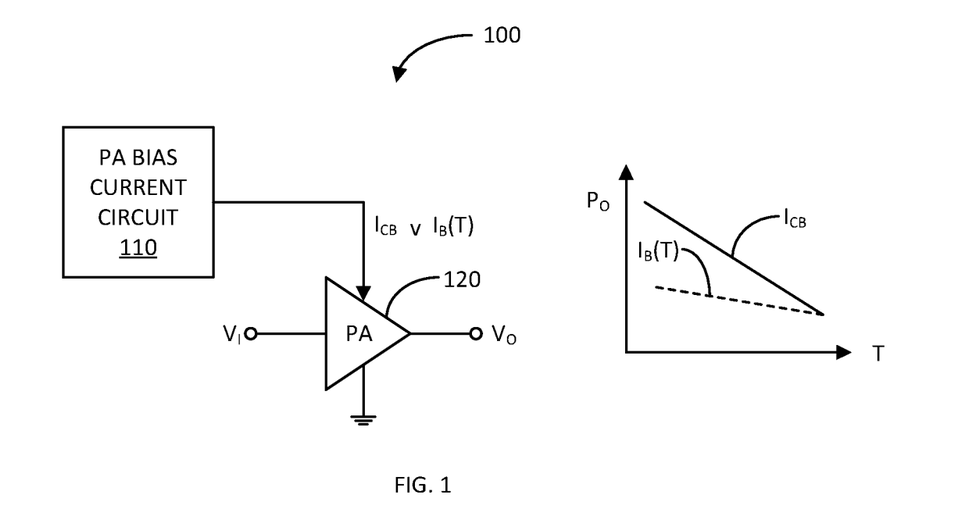
FIG. 1 illustrates a block diagram of an example amplifier circuit with an associated output power-versus-temperature graph in accordance with an aspect of the disclosure.

FIG. 1 illustrates a block diagram of an example amplifier circuit 100 with an associated output power-versus-temperature (Po v. T) graph in accordance with an aspect of the disclosure. The amplifier circuit 100 includes an amplifier 120, which may be configured as a driver or power amplifier (PA) or other type of amplifier, such as a low noise amplifier (LNA). The PA 120 receives and amplifies an input signal $V_I$ to generate an output signal $V_O$.

The amplifier circuit 100 further includes a PA bias current circuit 110 configured to generate a bias current $I_{CB}$ or $I_B(T)$ for the PA 120. The bias current $I_{CB}$ is a substantially constant current with temperature over an operating temperature range of the PA 120. The bias current $I_B(T)$ varies with temperature over the operating temperature range of the PA 120.

The constant bias current $I_{CB}$ for the PA 120 may not achieve target operating characteristics for the PA 120 over the operating temperature range. For example, with reference to the graph also shown in FIG. 1, with the constant bias current $I_{CB}$, the output power $P_O$ of the PA 120 may vary substantially over the operating temperature range. For example, as shown, the output power $P_O$ of the PA 120 has generally a negative slope over the operating temperature of the PA 120. Other operating characteristics of the PA 120 may also vary substantially with temperature using the constant bias current $I_{CB}$, such as a target linearity operating point, adjacent channel leakage ratio (ACLR), transconductance gain, third and fifth order intercept transconductance gains, etc.

The temperature-dependent bias current $I_B(T)$ may be configured to reduce variations in the various operating characteristics of the PA 120 or other type of amplifier (e.g., LNA). For example, as shown in the graph, the temperature-dependent bias current $I_B(T)$ may be configured to significantly reduce the variation in the output power $P_O$ (and/or other operating characteristics) of the PA 120 over the operating temperature range. For example, the bias current $I_B(T)$ may be configured to increase with temperature to cause the output power $P_O$ of the PA 120 to increase so as to compensate for the reduction in the output power $P_O$ with temperature if an otherwise constant bias current is used.

In summary, a temperature-dependent bias current generator is disclosed herein. The bias current generator receives two (or more) input currents with different temperature-dependent profiles over an operating temperature range of an amplifier, where the two temperature-dependent profiles intercept at a particular temperature within the operating temperature range. The bias current generator includes an analog processing circuit configured to generate at least one output current with a temperature-dependent profile based on a blending or combination of the temperature-dependent profiles of the input currents. In one case, the output current has a temperature-dependent profile based on a maximum of the temperature-dependent profiles of the input currents over a temperature range. In another case, the output current has a temperature-dependent profile based on a minimum of the temperature-dependent profiles of the input currents over a temperature range.

Figure 2:
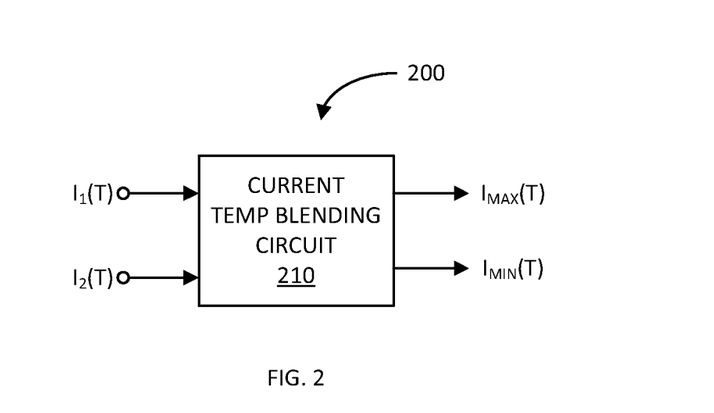
FIG. 2 illustrates a block diagram of an example current temperature blending circuit in accordance with the disclosure.

FIG. 2. illustrates a block diagram of an example bias current generator 200 in accordance with the disclosure. The bias current generator 200 includes a current temperature blending circuit 210 configured to receive first and second input currents $I_1(T)$ and $I_2(T)$, where T represents temperature. The first and second input currents $I_1(T)$ and $I_2(T)$ may have different temperature-dependent profiles. The different temperature-dependent profiles of the input currents $I_1(T)$ and $I_2(T)$ may intercept at a particular temperature $T_B$ over a temperature range $T_A$ to $T_C$.

The current temperature blending circuit 210 may be configured to generate at least one output current with a temperature-dependent profile being a combination or blending of the temperature-dependent profiles of the input currents $I_1(T)$ and $I_2(T)$. For example, the current temperature blending circuit 210 may generate an output current $I_{MAX}(T)$ with a temperature-dependent profile being a maximum of the temperature-dependent profiles of the input currents $I_1(T)$ and $I_2(T)$ over the temperature range $T_A$ to $T_C$.

For example, if the current $I_1(T)$ is greater than the current $I_2(T)$ over a temperature sub-range $T_A$ to $T_B$, where $T_B$ is the temperature at which the input currents $I_1(T)$ and $I_2(T)$ are equal or intercept, the current temperature blending circuit 210 generates the $I_{MAX}(T)$ current based on the current $I_1(T)$ over the temperature sub-range $T_A$ to $T_B$. In this example, the current $I_2(T)$ may be greater than the current $I_1(T)$ over the remaining temperature sub-range $T_B$ to $T_C$. In such case, the current temperature blending circuit 210 generates the $I_{MAX}(T)$ current based on the current $I_2(T)$ over the temperature sub-range $T_B$ to $T_C$.

The converse operation of the current temperature blending circuit 210 may also be performed for the case where the current $I_2(T)$ is greater than the current $I_1(T)$ over the temperature sub-range $T_A$ to $T_B$, and the current $I_1(T)$ is greater than the current $I_2(T)$ over the temperature sub-range $T_B$ to $T_C$. In such case, the current temperature blending circuit 210 generates the $I_{MAX}(T)$ current based on the current $I_2(T)$ over the temperature sub-range $T_A$ to $T_B$, and based on the current $I_1(T)$ over the temperature sub-range $T_B$ to $T_C$.

Alternatively, or in addition to, the current temperature blending circuit 210 may generate an output current $I_{MIN}(T)$ with a temperature-dependent profile being a minimum of the temperature-dependent profiles of the input currents $I_1(T)$ and $I_2(T)$ over the temperature range $T_A$ to $T_C$. For example, if the current $I_1(T)$ is less than the current $I_2(T)$ over the temperature sub-range $T_A$ to $T_B$, the current temperature blending circuit 210 generates the $I_{MIN}(T)$ current based on the current $I_1(T)$ over the temperature sub-range $T_A$ to $T_B$. In this example, the current $I_2(T)$ may be less than the current $I_1(T)$ over the remaining temperature sub-range $T_B$ to $T_C$. In such case, the current temperature blending circuit 210 generates the $I_{MIN}(T)$ current based on the current $I_2(T)$ over the temperature sub-range $T_B$ to $T_C$.

The converse operation of the current temperature blending circuit 210 may also be performed for the case where the current $I_2(T)$ is less than the current $I_1(T)$ over the temperature sub-range $T_A$ to $T_B$, and the current $I_1(T)$ is less than the current $I_2(T)$ over temperature sub-range $T_B$ to $T_C$. In such case, the current temperature blending circuit 210 generates the $I_{MIN}(T)$ current based on the current $I_2(T)$ over the temperature sub-range $T_A$ to $T_B$, and based on the current $I_1(T)$ over the temperature sub-range $T_B$ to $T_C$. Various examples of input currents and resulting output currents are described below.

Figure 3A:
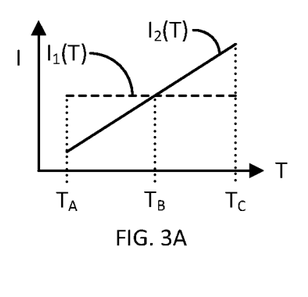
FIGS. 3A, 3B, and 3C illustrate graphs of example constant- and positive-slope temperature-dependent currents, a corresponding maximum blended temperature-dependent current, and a corresponding minimum blended temperature-dependent current in accordance with another aspect of the disclosure.

FIG. 3A illustrates a graph of a first input current $I_1(T)$ having a substantially constant temperature-dependent profile over a temperature range $T_A$ to $T_C$ (e.g., a bandgap current). The graph also illustrates a second input current $I_2(T)$ with a temperature-dependent profile, which varies linearly with a positive slope over the temperature range $T_A$ to $T_C$ (e.g., a proportional to absolute temperature (PTAT) current). The temperature-dependent profiles of the currents $I_1(T)$ and $I_2(T)$ intercept at a particular temperature $T_B$ within the temperature range $T_A$ to $T_C$.

Figure 3B:
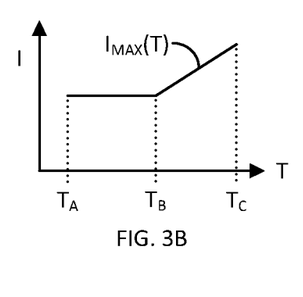

FIG. 3B illustrates a graph of an output current $I_{MAX}(T)$ with a temperature-dependent profile based on a maximum of the temperature-dependent profiles of the input currents $I_1(T)$ and $I_2(T)$. Below the intercept temperature $T_B$, the input current $I_1(T)$ is greater than the input current $I_2(T)$; thus, the current temperature blending circuit 210 generates the output current $I_{MAX}(T)$ based on the current $I_1(T)$ over the temperature sub-range $T_A$ to $T_B$. Above the intercept temperature $T_B$, the input current $I_2(T)$ is greater than the input current $I_1(T)$; thus, the current temperature blending circuit 210 generates the output current $I_{MAX}(T)$ based on the current $I_2(T)$ over the temperature sub-range $T_B$ to $T_C$. Thus, the output current $I_{MAX}(T)$ has a temperature-dependent profile that is substantially constant over the temperature sub-range $T_A$ to $T_B$, and varies with a positive slope over the temperature sub-range $T_B$ to $T_C$.

Figure 3C:
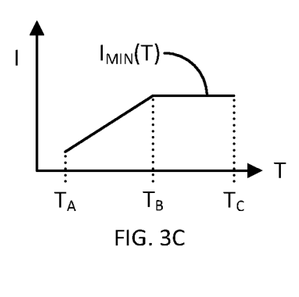

FIG. 3C illustrates a graph of an output current $I_{MIN}(T)$ with a temperature-dependent profile based on a minimum of the temperature-dependent profiles of the input currents $I_1(T)$ and $I_2(T)$. Below the intercept temperature $T_B$, the input current $I_2(T)$ is less than the input current $I_1(T)$; thus, the current temperature blending circuit 210 generates the output current $I_{MIN}(T)$ based on the current $I_2(T)$ over the temperature sub-range $T_A$ to $T_B$. Above the intercept temperature $T_B$, the input current $I_1(T)$ is less than the input current $I_2(T)$; thus, the current temperature blending circuit 210 generates the output current $I_{MIN}(T)$ based on the current $I_1(T)$ over the temperature sub-range $T_B$ to $T_C$. Thus, the output current $I_{MIN}(T)$ has a temperature-dependent profile that varies with a positive slope over the temperature sub-range $T_A$ to $T_B$, and is substantially constant over temperature sub-range $T_B$ to $T_C$.

Figure 4A:
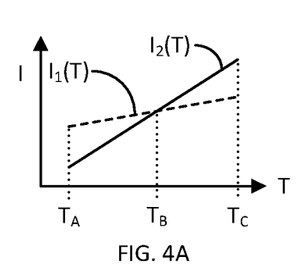
FIGS. 4A, 4B, and 4C illustrate graphs of example two different positive-slope temperature-dependent currents, a corresponding maximum blended temperature-dependent current, and a corresponding minimum blended temperature-dependent current in accordance with another aspect of the disclosure.

FIG. 4A illustrates a graph of a first input current $I_1(T)$ with a temperature-dependent profile that varies linearly with a first positive slope over a temperature range $T_A$ to $T_C$ (e.g., a first PTAT current). The graph also illustrates a second input current $I_2(T)$ with a temperature-dependent profile that varies linearly with a second positive slope over the temperature range $T_A$ to $T_C$ (e.g., a second PTAT current). In this example, the second positive slope is greater than the first positive slope. The temperature-dependent profiles of the currents $I_1(T)$ and $I_2(T)$ intercept at a particular temperature $T_B$ within the temperature range $T_A$ to $T_C$.

Figure 4B:
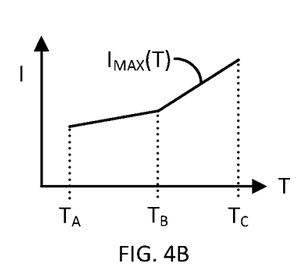

FIG. 4B illustrates a graph of an output current $I_{MAX}(T)$ with a temperature-dependent profile based on a maximum of the temperature-dependent profiles of the input currents $I_1(T)$ and $I_2(T)$. Below the intercept temperature $T_B$, the input current $I_1(T)$ is greater than the input current $I_2(T)$; thus, the current temperature blending circuit 210 generates the output current $I_{MAX}(T)$ based on the current $I_1(T)$ over the temperature sub-range $T_A$ to $T_B$. Above the intercept temperature $T_B$, the input current $I_2(T)$ is greater than the input current $I_1(T)$; thus, the current temperature blending circuit 210 generates the output current $I_{MAX}(T)$ based on the current $I_2(T)$ over the temperature sub-range $T_B$ to $T_C$. Thus, the output current $I_{MAX}(T)$ has a temperature-dependent profile that that varies with the first positive slope over the temperature sub-range $T_A$ to $T_B$, and varies with the second positive slope over the temperature sub-range $T_B$ to $T_C$.

Figure 4C:
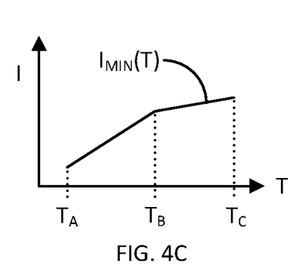

FIG. 4C illustrates a graph of an output current $I_{MIN}(T)$ with a temperature-dependent profile based on a minimum of the temperature-dependent profiles of the input currents $I_1(T)$ and $I_2(T)$. Below the intercept temperature $T_B$, the input current $I_2(T)$ is less than the input current $I_1(T)$; thus, the current temperature blending circuit 210 generates the output current $I_{MIN}(T)$ based on the current $I_2(T)$ over the temperature sub-range $T_A$ to $T_B$. Above the intercept temperature $T_B$, the input current $I_1(T)$ is less than the input current $I_2(T)$; thus, the current temperature blending circuit 210 generates the output current $I_{MIN}(T)$ based on the current $I_1(T)$ over the temperature sub-range $T_B$ to $T_C$. Thus, the output current $I_{MIN}(T)$ has a temperature-dependent profile that varies with the second positive slope over the temperature sub-range $T_A$ to $T_B$, and varies with the first positive slope over the temperature sub-range $T_B$ to $T_C$.

Figure 5A:
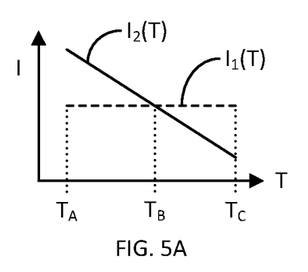
FIGS. 5A, 5B, and 5C illustrate graphs of example constant- and negative-slope temperature-dependent currents, a corresponding maximum blended temperature-dependent current, and a corresponding minimum blended temperature-dependent current in accordance with another aspect of the disclosure.

FIG. 5A illustrates a graph of a first input current $I_1(T)$ having a substantially constant temperature-dependent profile over a temperature range $T_A$ to $T_C$ (e.g., a bandgap current). The graph also illustrates a second input current $I_2(T)$ with a temperature-dependent profile, which varies linearly with a negative slope over the temperature range $T_A$ to $T_C$ (e.g., a complementary to absolute temperature (CTAT) current). The temperature-dependent profiles of the currents $I_1(T)$ and $I_2(T)$ intercept at a particular temperature $T_B$ within the temperature range $T_A$ to $T_C$.

Figure 5B:
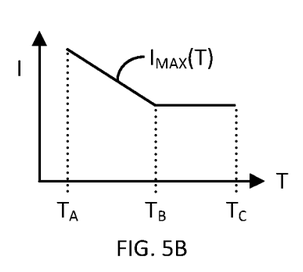

FIG. 5B illustrates a graph of an output current $I_{MAX}(T)$ with a temperature-dependent profile based on a maximum of the temperature-dependent profiles of the input currents $I_1(T)$ and $I_2(T)$. Below the intercept temperature $T_B$, the input current $I_2(T)$ is greater than the input current $I_1(T)$; thus, the current temperature blending circuit 210 generates the output current $I_{MAX}(T)$ based on the current $I_2(T)$ over the temperature sub-range $T_A$ to $T_B$. Above the intercept temperature $T_B$, the input current $I_1(T)$ is greater than the input current $I_2(T)$; thus, the current temperature blending circuit 210 generates the output current $I_{MAX}(T)$ based on the current $I_1(T)$ over the temperature sub-range $T_B$ to $T_C$. Thus, the output current $I_{MAX}(T)$ has a temperature-dependent profile that varies with a negative slope over the temperature sub-range $T_A$ to $T_B$, and is substantially constant over the temperature sub-range $T_B$ to $T_C$.

Figure 5C:
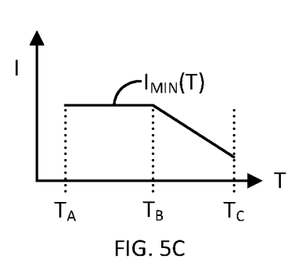

FIG. 5C illustrates a graph of an output current $I_{MIN}(T)$ with a temperature-dependent profile based on a minimum of the temperature-dependent profiles of the input currents $I_1(T)$ and $I_2(T)$. Below the intercept temperature $T_B$, the input current $I_1(T)$ is less than the input current $I_2(T)$; thus, the current temperature blending circuit 210 generates the output current $I_{MIN}(T)$ based on the current $I_1(T)$ over the temperature sub-range $T_A$ to $T_B$. Above the intercept temperature $T_B$, the input current $I_2(T)$ is less than the input current $I_1(T)$; thus, the current temperature blending circuit 210 generates the output current $I_{MIN}(T)$ based on the current $I_2(T)$ over the temperature sub-range $T_B$ to $T_C$. Thus, the output current $I_{MIN}(T)$ has a temperature-dependent profile that is substantially constant over the temperature sub-range $T_A$ to $T_B$, and varies with a negative slope over the temperature sub-range $T_B$ to $T_C$.

Figure 6A:
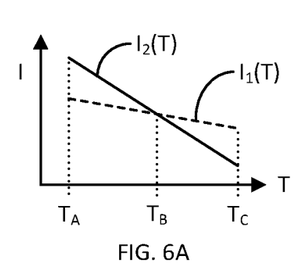
FIGS. 6A, 6B, and 6C illustrate graphs of two different negative-slope temperature-dependent currents, a corresponding maximum blended temperature-dependent current, and a corresponding minimum blended temperature-dependent current in accordance with another aspect of the disclosure.

FIG. 6A illustrates a graph of a first input current $I_1(T)$ with temperature-dependent profile that varies linearly with a first negative slope over a temperature range $T_A$ to $T_C$ (e.g., a first CTAT current). The graph also illustrates a second input current $I_2(T)$ with a temperature-dependent profile that varies linearly with a second negative slope over the temperature range $T_A$ to $T_C$ (e.g., a second CTAT current). In this example, the second negative slope is more negative than the first negative slope. The temperature-dependent profiles of the currents $I_1(T)$ and $I_2(T)$ intercept at a particular temperature $T_B$ within the temperature range $T_A$ to $T_C$.

Figure 6B:
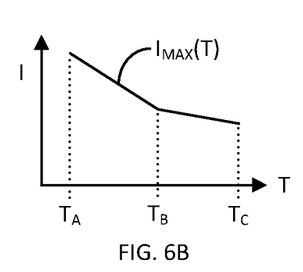

FIG. 6B illustrates a graph of an output current $I_{MAX}(T)$ with a temperature-dependent profile based on a maximum of the temperature-dependent profiles of the input currents $I_1(T)$ and $I_2(T)$. Below the intercept temperature $T_B$, the input current $I_2(T)$ is greater than the input current $I_1(T)$; thus, the current temperature blending circuit 210 generates the output current $I_{MAX}(T)$ based on the current $I_2(T)$ over the temperature sub-range $T_A$ to $T_B$. Above the intercept temperature $T_B$, the input current $I_1(T)$ is greater than the input current $I_2(T)$; thus, the current temperature blending circuit 210 generates the output current $I_{MAX}(T)$ based on the current $I_1(T)$ over the temperature sub-range $T_B$ to $T_C$. Thus, the output current $I_{MAX}(T)$ has a temperature-dependent profile that varies with the second negative slope over the temperature sub-range $T_A$ to $T_B$, and varies with the first negative slope over the temperature sub-range $T_B$ to $T_C$.

Figure 6C:
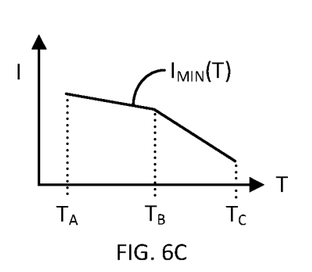

FIG. 6C illustrates a graph of an output current $I_{MIN}(T)$ with a temperature-dependent profile based on a minimum of the temperature-dependent profiles of the input currents $I_1(T)$ and $I_2(T)$. Below the intercept temperature $T_B$, the input current $I_1(T)$ is less than the input current $I_2(T)$; thus, the current temperature blending circuit 210 generates the output current $I_{MIN}(T)$ based on the current $I_1(T)$ over the temperature sub-range $T_A$ to $T_B$. Above the intercept temperature $T_B$, the input current $I_2(T)$ is less than the input current $I_1(T)$; thus, the current temperature blending circuit 210 generates the output current $I_{MIN}(T)$ based on the current $I_2(T)$ over the temperature sub-range $T_B$ to $T_C$. Thus, the output current $I_{MIN}(T)$ has a temperature-dependent profile that varies with the first negative slope over the temperature sub-range $T_A$ to $T_B$, and varies with the second negative slope over the temperature sub-range $T_B$ to $T_C$.

Figure 7:
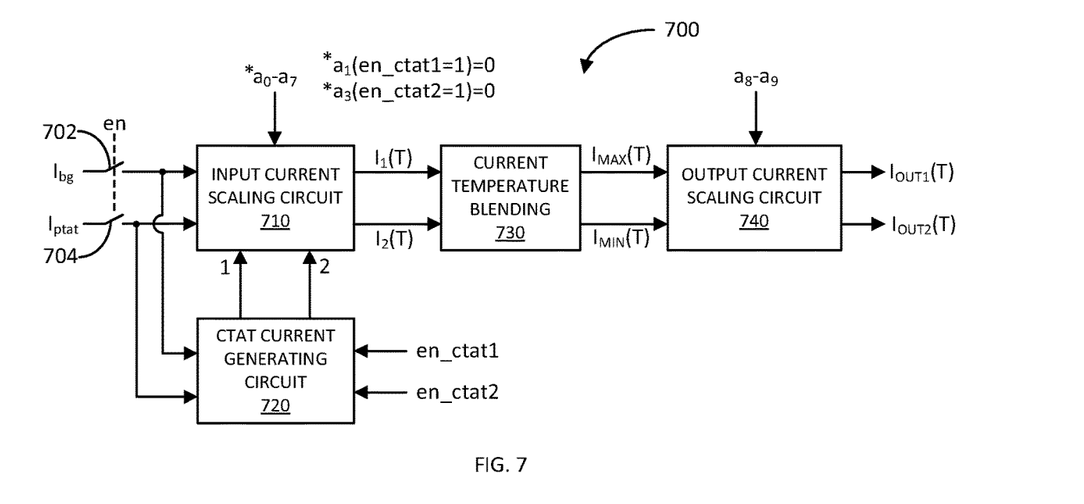
FIG. 7 illustrates a block diagram of another example bias current generator in accordance with the disclosure.

FIG. 7 illustrates a block diagram of an example bias current generator 700 in accordance with another aspect of the disclosure. The bias current generator 700 includes an input current scaling circuit 710, a negative-slope (CTAT) current generating circuit 720, a current temperature blending circuit 730, and an output current scaling circuit 740.

The input current scaling circuit 710 is configured to receive a bandgap current $I_{bg}$ and a PTAT current $I_{ptat}$ by way of switching devices 702 and 704, respectively. The switching devices 702 and 704 may be responsive to an enable signal (en). For example, the switching devices 702 and 704 may be closed in response to the enable signal (en) being asserted (e.g., en=1), or may be open in response to the enable signal (en) being deasserted (e.g., en=0). In this regard, the enable signal (en) effectively enables and disables the bias current generator 700.

When the enable signal (en) is asserted (and the CTAT current generating circuit 720 is disabled, as discussed further herein), the input current scaling circuit 710 is configured to generate input currents $I_1(T)$ and $I_2(T)$ by combining and scaling the bandgap current $I_{bg}$ and the PTAT current $I_{ptat}$. For example, as discussed in more detail later herein with respect to an example implementation, the input current scaling circuit 710 may be configured to generate the input currents $I_1(T)$ and $I_2(T)$ in accordance with the following relationships:

$$I_1(T)=a_0 I_{bg}+a_1 * I_{ptat} \qquad \text{Eq. 1}$$

$$I_2(T)=a_2 * I_{bg}+a_3 * I_{ptat} \qquad \text{Eq. 2}$$

where $a_0$, $a_1$, $a_2$, and $a_3$ may be programmable scaling factors.

For example, if the current $I_1(T)$ is configured to be substantially constant with temperature as in the examples illustrated in FIGS. 3A, 3B, and 3C, the scaling factor $a_0$ may be programmed to be one (1) (or other positive value) and the scaling factor $a_1$ may be programmed to be zero (0). In such case, the current $I_1(T)$ varies with the bandgap current $I_{bg}$ and not with the PTAT current $I_{ptat}$. The current $I_1(T)$ may alternatively be set with a positive slope given by the ratio $a_1/a_0$ (where $a_0$ and $a_1$ are positive values). Thus, the current $I_1(T)$ has a programmable slope $a_1/a_0$. Additionally, if the current $I_2(T)$ is configured to have a positive slope, the scaling factors $a_2$ and $a_3$ may be programmed to be positive values, wherein the slope may be given by the ratio of $a_3/a_2$. Thus, the current $I_2(T)$ has a programmable slope $a_3/a_2$.

Considering the examples illustrated in FIGS. 4A, 4B, and 4C, the currents $I_1(T)$ and $I_2(T)$ vary with temperature with first and second positive slopes, respectively. In this example, the first slope of the current $I_1(T)$ is less than the second slope of the current $I_2(T)$. Accordingly, the scaling factors $a_0$ and $a_1$ associated with the current $I_1(T)$ are programmed to generate the first positive slope ($a_1/a_0$), and the scaling factors $a_2$ and $a_3$ associated with the current $I_2(T)$ are programmed to generate the second positive slope ($a_3/a_2$), wherein the first positive slope is less than the second positive slope (e.g., $a_1/a_0 < a_3/a_2$).

The negative-slope (CTAT) current generating circuit 720 may be configured to cause the input current scaling circuit 710 to generate the currents $I_1(T)$ and $I_2(T)$ with temperature variations having negative slopes in response to CTAT enable signals en_ctat1 and en_ctat2 being asserted (e.g., en_ctat1=en_ctat2=1). If the CTAT enable signals en_ctat1 and en_ctat2 are deasserted, the CTAT current generating circuit 720 is disabled, and the input current scaling circuit 710 generates the currents $I_1(T)$ and $I_2(T)$ in accordance with Eqs. 1 and 2, respectively. As further indicated, the input current scaling circuit 710 may be configured to program or set the scaling factors $a_1$ and $a_3$ to zero (0) in response to the CTAT enable signals en_ctat1 and en_ctat2 being asserted. Accordingly, when the CTAT enable signals en_ctat1 and en_ctat2 are asserted, the currents $I_1(T)$ and $I_2(T)$ may be generated in accordance with the following relationship:

$$I_1(T)=a_0 * I_{bg}(a_6 * I_{bg}-a_7 * I_{ptat}) \qquad \text{Eq. 3}$$

$$I_2(T)=a_2 * I_{bg}+(a_4 * I_{bg}-a_5 * I_{ptat}) \qquad \text{Eq. 4}$$

where $a_4$, $a_5$, $a_6$, and $a_7$ may also be programmable scaling factors. As discussed further herein with respect to another implementation, it shall be understood that the ability to configure one of the currents, such as the current $I_1(T)$, to have a negative slope is optional.

Considering the examples of FIGS. 5A, 5B, and 5C, if the current $I_1(T)$ is programmed to be substantially constant with temperature, the CTAT enable signal en_ctat1 is set to 0 (equivalent to setting $a_7=0$) to decouple the CTAT current generating circuit 720 from the $I_1(T)$ current generating portion of the input current scaling circuit 710. In such case, the current $I_1(T)$ varies with the bandgap current $I_{bg}$ and not with the PTAT current $I_{ptat}$. If the current $I_2(T)$ is configured to have a negative slope, the CTAT enable signal en_ctat2 is set to 1 (equivalent to setting $a_5$ to a positive value) to couple the CTAT current generating circuit 720 to the $I_2(T)$ current generating portion of the input current scaling circuit 710. Accordingly, the scaling factors $a_2$, $a_4$, and $a_5$ may be programmed to achieve a negative slope in accordance with the following relationship: slope $\sim -a_5/(a_2+a_4)$. Thus, the current $I_2(T)$ has a programmable slope $-a_5/(a_2+a_4)$.

Considering the examples of FIGS. 6A, 6B, and 6C, if the current $I_1(T)$ is programmed to have a negative slope, the CTAT enable signal en_ctat1 is set to 1 (equivalent to setting $a_7$ to a positive value) to couple the CTAT current generating circuit 720 to the $I_1(T)$ current generating portion of the input current scaling circuit 710. Accordingly, the scaling factors $a_0$, $a_6$, and $a_7$ may be programmed to achieve a negative slope in accordance with the following relationship: slope $\sim -a_7/(a_0+a_6)$. Thus, the current $I_1(T)$ has a programmable slope $-a_7/(a_0+a_6)$. If the current $I_2(T)$ is configured to have a negative slope, the CTAT enable signal en_ctat2 is set to 1 (equivalent to setting as to a positive value) to couple the CTAT current generating circuit 720 to the $I_2(T)$ current generating portion of the input current scaling circuit 710. Accordingly, the scaling factors $a_2$, $a_4$, and $a_5$ may be programmed to achieve a negative slope in accordance with the following relationship: slope $\sim -a_5/(a_2+a_4)$.

The current temperature blending circuit 730 is configured to combine or blend the input currents $I_1(T)$ and $I_2(T)$ to generate an $I_{MAX}(T)$ current and/or an $I_{MIN}(T)$ current, similarly as discussed with reference to current temperature blending circuit 210. That is, the current temperature blending circuit 730 is configured to generate the $I_{MAX}(T)$ current based on the maximum of the currents $I_1(T)$ and $I_2(T)$ over a temperature range. Similarly, the current temperature blending circuit 730 is configured to generate the $I_{MIN}(T)$ current based on the minimum of the currents $I_1(T)$ and $I_2(T)$ over the temperature range.

The output current scaling circuit 740 is configured to apply scaling factors $a_8$ and $a_9$ to the $I_{MAX}(T)$ and $I_{MIN}(T)$ currents to generate output currents $I_{OUT1}(T)$ and $I_{OUT2}(T)$, respectively. Accordingly, the following relationships for the output currents $I_{OUT1}(T)$ and $T_{OUT2}(T)$ may apply:

$$I_{OUT1}(T) = a_8 * I_{MAX}(T) \quad \text{Eq. 5}$$

$$I_{OUT2}(T) = a_9 * I_{MIN}(T) \quad \text{Eq. 6}$$

As discussed further herein with reference to an example implementation, the output current scaling circuit 740 may be configured to selectively route the output currents $I_{OUT1}(T)$ and $I_{OUT2}(T)$ between two different output nodes.

Figure 8A:
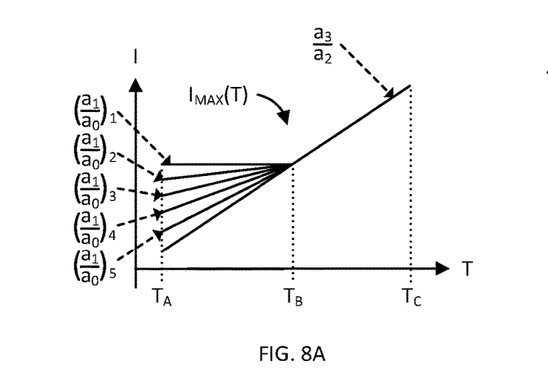
FIGS. 8A, 8B, 8C, 8D, 8E, 8F, 8G, 8H, 8I, and 8J illustrate graphs of example blended temperature-dependent currents in accordance with another aspect of the disclosure.

FIG. 8A illustrates a graph of the current $I_{MAX}(T)$ generated by the current temperature blending circuit 730 for different values $(a_1/a_0)_1$ to $(a_{1/4})_5$ of the slope $a_1/a_0$ of the current $I_1(T)$, while maintaining the slope $a_3/a_2$ of the current $I_2(T)$ constant in accordance with another aspect of the disclosure. This graph pertains to the case where the CTAT current generating circuit 720 is disabled (e.g., en_ctat1=en_ctat2=0), and the currents $I_1(T)$ and $I_2(T)$ given by Eqs. 1 and 2, respectively. As the graph illustrates, by programming different values for the scaling factors $a_0$ and $a_1$, a set of different slopes $(a_1/a_0)_1$ to $(a_1/a_0)_5$ for the current $I_1(T)$ may be achieved. In this example, the set of different slopes $(a_{1/4})_1$ to $(a_1/a_0)_5$ are in ascending order, with slope $(a_1/a_0)_1$ being substantially zero (0) by setting scaling factor $a_1$ to zero (0). As the current $I_{MAX}(T)$ is depicted in FIG. 8A, the current $I_{MAX}(T)$ is based on the current $I_1(T)$ over the temperature range $T_A$ to $T_B$, and based on the current $I_2(T)$ over the temperature range $T_B$ to $T_C$.

Figure 8B:
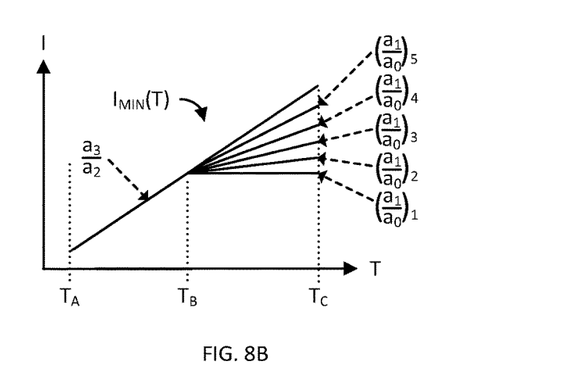

FIG. 8B illustrates a graph of the current $I_{MIN}(T)$ generated by the current temperature blending circuit 730 for different values $(a_1/a_0)_1$ to $(a_1/a_0)_5$ of the slope $a_1/a_0$ of the current $I_1(T)$, while maintaining the slope $a_3/a_2$ of the current $I_2(T)$ constant in accordance with another aspect of the disclosure. This graph pertains to the case where the CTAT current generating circuit 720 is disabled (e.g., en_ctat1=en_ctat2=0), and the currents $I_1(T)$ and $I_2(T)$ given by Eqs. 1 and 2, respectively. As the graph illustrates, by programming different values for the scaling factors $a_0$ and $a_1$, a set of different slopes $(a_1/a_0)_1$ to $(a_1/a_0)_5$ for the current $I_1(T)$ may be achieved. In this example, the set of different slopes $(a_{1/4})_1$ to $(a_1/a_0)_5$ are in ascending order, with slope $(a_{1/4})_1$ being substantially zero (0) by setting scaling factor $a_1$ to zero (0). As the current $I_{MIN}(T)$ is depicted in FIG. 8B, the current $I_{MIN}(T)$ is based on the current $I_2(T)$ over the temperature range $T_A$ to $T_B$, and based on the current $I_1(T)$ over the temperature range $T_B$ to $T_C$.

Figure 8C:
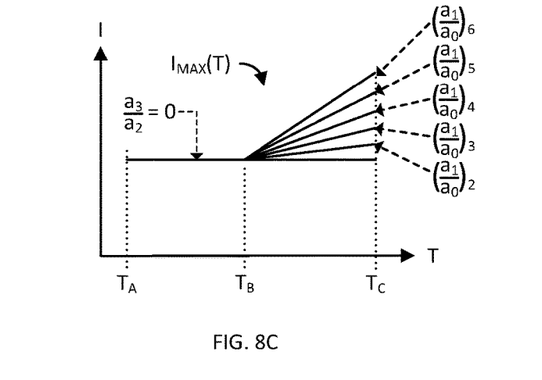

FIG. 8C illustrates a graph of the current $I_{MAX}(T)$ generated by the current temperature blending circuit 730 for different values $(a_1/a_0)_2$ to $(a_1/a_0)_6$ of the slope $a_1/a_0$ of the current $I_1(T)$, while maintaining the slope $a_3/a_2=0$ (e.g., $a_3=0$) of the current $I_2(T)$ constant in accordance with another aspect of the disclosure. This graph pertains to the case where the CTAT current generating circuit 720 is disabled (e.g., en_ctat1=en_ctat2=0), and the currents $I_1(T)$ and $I_2(T)$ given by Eqs. 1 and 2, respectively. As the graph illustrates, by programming different values for the scaling factors $a_0$ and $a_1$, a set of different slopes $(a_1/a_0)_2$ to $(a_1/a_0)_6$ for the current $I_1(T)$ may be achieved. In this example, the set of different slopes $(a_1/a_0)_2$ to $(a_1/a_0)_6$ are in ascending order. As the current $I_{MAX}(T)$ is depicted in FIG. 8C, the current $I_{MAX}(T)$ is based on the current $I_2(T)$ over the temperature range $T_A$ to $T_B$, and based on the current $I_1(T)$ over the temperature range $T_B$ to $T_C$.

Figure 8D:
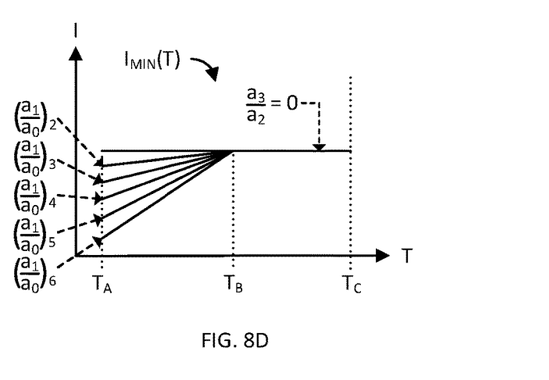

FIG. 8D illustrates a graph of the current $I_{MIN}(T)$ generated by the current temperature blending circuit 730 for different values $(a_1/a_0)_2$ to $(a_1/a_0)_6$ of the slope $a_1/a_0$ of the current $I_1(T)$, while maintaining the slope $a_3/a_2=0$ (e.g., $a_3=0$) of the current $I_2(T)$ constant in accordance with another aspect of the disclosure. This graph pertains to the case where the CTAT current generating circuit 720 is disabled (e.g., en_ctat1=en_ctat2=0), and the currents $I_1(T)$ and $I_2(T)$ given by Eqs. 1 and 2, respectively. As the graph illustrates, by programming different values for the scaling factors $a_0$ and $a_1$, a set of different slopes $(a_1/a_0)_2$ to $(a_1/a_0)_6$ for the current $I_1(T)$ may be achieved. In this example, the set of different slopes $(a_1/a_0)_2$ to $(a_1/a_0)_6$ are in ascending order. As the current $I_{MIN}(T)$ is depicted in FIG. 8D, the current $I_{MIN}(T)$ is based on the current $I_1(T)$ over the temperature range $T_A$ to $T_B$, and based on the current $I_2(T)$ over the temperature range $T_B$ to $T_C$.

Figure 8E:
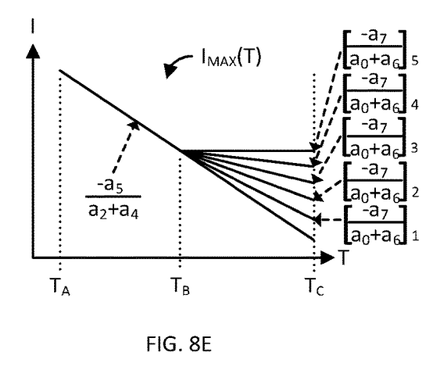

FIG. 8E illustrates a graph of the current $I_{MAX}(T)$ generated by the current temperature blending circuit 730 for different values $[-a_7/(a_0+a_6)]_1$ to $[-a_7/(a_0+a_6)]_5$ of the slope $[-a_7/(a_0+a_6)]$ of the current $I_1(T)$, while maintaining the slope $[-a_5/(a_2+a_4)]$ of the current $I_2(T)$ constant in accordance with another aspect of the disclosure. This graph pertains to the case where the CTAT current generating circuit 720 is enabled (e.g., en_ctat1=en_ctat2=1), and the currents $I_1(T)$ and $I_2(T)$ given by Eqs. 3 and 4, respectively. As the graph illustrates, by programming different values for the scaling factors $a_1$, $a_6$, and $a_7$, a set of different slopes $[-a_7/(a_0+a_6)]_1$ to $[-a_7/(a_0+a_6)]_5$ for the current $I_1(T)$ may be achieved. In this example, the set of different slopes $[-a_7/(a_0+a_6)]_1$ to $[-a_7/(a_0+a_6)]_5$ are in ascending order, with the slope $[-a_7/(a_0+a_6)]_5$ being substantially zero (0) (e.g., by setting en_ctat1 or $a_7$ to 0). As the current $I_{MAX}(T)$ is depicted in FIG. 8E, the current $I_{MAX}(T)$ is based on the current $I_2(T)$ over the temperature range $T_A$ to $T_B$, and based on the current $I_1(T)$ over the temperature range $T_B$ to $T_C$.

Figure 8F:
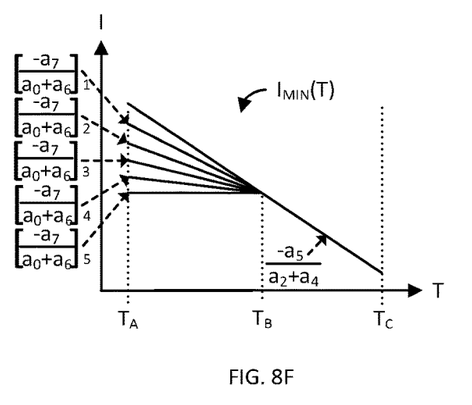

FIG. 8F illustrates a graph of the current $I_{MIN}(T)$ generated by the current temperature blending circuit 730 for different values $[-a_7/(a_0+a_6)]_1$ to $[-a_7/(a_0+a_6)]_5$ of the slope $[-a_7/(a_0+a_6)]$ of the current $I_1(T)$, while maintaining the slope $[-a_5/(a_2+a_4)]$ of the current $I_2(T)$ constant in accordance with another aspect of the disclosure. This graph pertains to the case where the CTAT current generating circuit 720 is enabled (e.g., en_ctat1=en_ctat2=1), and the currents $I_1(T)$ and $I_2(T)$ given by Eqs. 3 and 4, respectively.

As the graph illustrates, by programming different values for the scaling factors $a_1$, $a_6$, and $a_7$, a set of different slopes $[-a_7/(a_0+a_6)]_1$ to $[-a_7/(a_0+a_6)]_5$ for the current $I_1(T)$ may be achieved. In this example, the set of different slopes $[-a_7/(a_0+a_6)]_1$ to $[-a_7/(a_0+a_6)]_5$ are in ascending order, with the slope $[-a_7/(a_0+a_6)]_5$ being substantially zero (0) (e.g., by setting en_ctat1 or $a_7$ to 0). As the current $I_{MIN}(T)$ is depicted in FIG. 8F, the current $I_{MIN}(T)$ is based on the current $I_1(T)$ over the temperature range $T_A$ to $T_B$, and based on the current $I_2(T)$ over the temperature range $T_B$ to $T_C$.

Figure 8G:
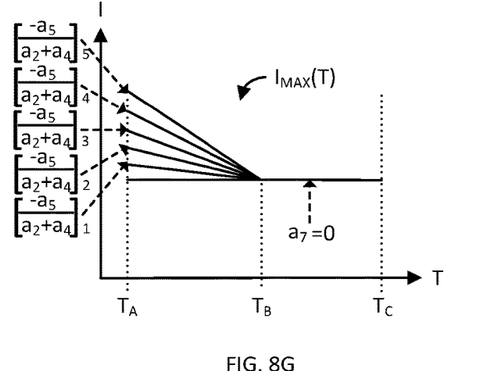

FIG. 8G illustrates a graph of the current $I_{MAX}(T)$ generated by the current temperature blending circuit 730 for different values $[-a_5/(a_2+a_4)]_1$ to $[-a_5/(a_2+a_4)]_5$ of the slope $[-a_5/(a_2+a_4)]$ of the current $I_2(T)$, while maintaining the slope $(a_7=0)$ of the current $I_1(T)$ set to substantially zero (0) in accordance with another aspect of the disclosure. This graph pertains to the case where the CTAT current generating circuit 720 is partially enabled (e.g., en_ctat1=$a_7$=0 and en_ctat2=1), and the currents $I_1(T)$ and $I_2(T)$ are given by Eqs. 3 and 4, respectively. As the graph illustrates, by programming different values for the scaling factors $a_2$, $a_4$, and $a_5$, a set of different slopes $[-a_5/(a_2+a_4)]_1$ to $[-a_5/(a_2+a_4)]_5$ for the current $I_2(T)$ may be achieved. In this example, the set of different slopes $[-a_5/(a_2+a_4)]_1$ to $[-a_5/(a_2+a_4)]_5$ are in descending order. As the current $I_{MAX}(T)$ is depicted in FIG. 8G, the current $I_{MAX}(T)$ is based on the current $I_2(T)$ over temperature range $T_A$ to $T_B$, and based on the current $I_1(T)$ over temperature range $T_B$ to $T_C$.

Figure 8H:
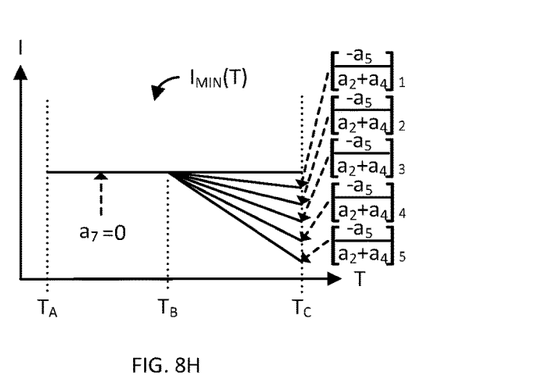

FIG. 8H illustrates a graph of the current $I_{MAX}(T)$ generated by the current temperature blending circuit 730 for different values $[-a_5/(a_2+a_4)]_1$ to $[-a_5/a_2+a_4)]_5$ of the slope $[-a_5/(a_2+a_4)]$ of the current $I_2(T)$ while maintaining the slope $(a_7=0)$ of the current $I_1(T)$ at substantially zero (0) in accordance with another aspect of the disclosure. This graph pertains to the case where the CTAT current generating circuit 720 is partially enabled (e.g., en_ctat1=$a_7$=0 and en_ctat2=1), and the currents $I_1(T)$ and $I_2(T)$ are given by Eqs. 3 and 4, respectively. As the graph illustrates, by programming different values for the scaling factors $a_2$, $a_4$, and $a_5$, a set of different slopes $[-a_5/(a_2+a_4)]_1$ to $[-a_5/(a_2+a_4)]_5$ for the current $I_2(T)$ may be achieved. In this example, the set of different slopes $[-a_5/(a_2+a_4)]_1$ to $[-a_5/(a_2+a_4)]_5$ are in descending order. As the current $I_{MIN}(T)$ is depicted in FIG. 8H, the current $I_{MIN}(T)$ is based on the current $I_1(T)$ over temperature range $T_A$ to $T_B$, and based on the current $I_2(T)$ over temperature range $T_B$ to $T_C$.

Figure 8I:
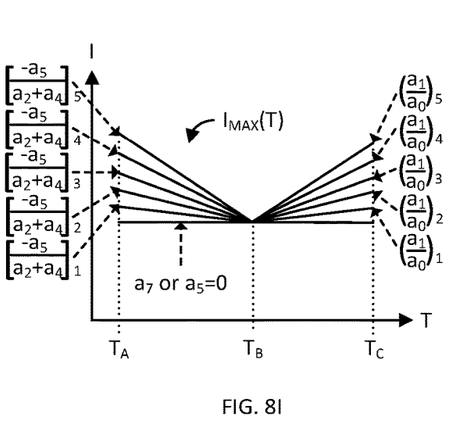

FIG. 8I illustrates a graph of the current $I_{MAX}(T)$ generated by the current temperature blending circuit 730 for different values $(a_1/a_0)_1$ to $(a_1/a_0)_5$ of the slope $a_1/a_0$ of the current $I_1(T)$ and different values $[-a_5/(a_2+a_4)]_1$ to $[-a_5/(a_2+a_4)]_5$ of the slope $[-a_5/(a_2+a_4)]$ of the current $I_2(T)$ in accordance with another aspect of the disclosure. This graph pertains to the case where the CTAT current generating circuit 720 is disabled for the $I_1(T)$ current and enabled for the $I_2(T)$ current (e.g., en_ctat1=0 and en_ctat2=1), and the currents $I_1(T)$ and $I_2(T)$ are given by Eqs. 1 and 4, respectively. As the graph illustrates, by programming different values for the scaling factors $a_0$-$a_5$, two sets of different slopes $(a_1/a_0)_1$ to $(a_1/a_0)_5$ and $[-a_5/(a_2+a_4)]$ to $[-a_5/(a_2+a_4)]_5$ for the currents $I_1(T)$ and $I_2(T)$ may be achieved, respectively. In this example, the two sets of different slopes $(a_1/a_0)_1$ to $(a_1/a_0)_5$ and $[-a_5/(a_2+a_4)]_1$ to $[-a_5/(a_2+a_4)]_5$ are both in ascending order. As the current $I_{MAX}(T)$ is depicted in FIG. 8I, the current $I_{MAX}(T)$ is based on the current $I_2(T)$ over temperature range $T_A$ to $T_B$, and based on the current $I_1(T)$ over temperature range $T_B$ to $T_C$.

It shall be understood that another option pertaining to the CTAT current generating circuit 720 being enabled for the $I_1(T)$ current and disabled for the $I_2(T)$ current (e.g., en_ctat1=1 and en_ctat2=0) may be available. According to this option, the currents $I_1(T)$ and $I_2(T)$ are given by Eqs. 3 and 2, respectively.

Figure 8J:
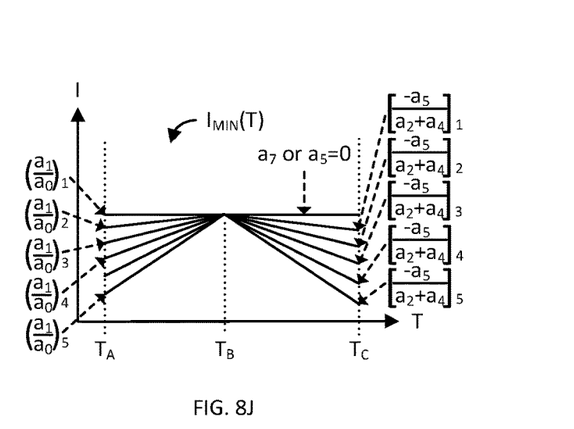

FIG. 8J illustrates a graph of the current $I_{MIN}(T)$ generated by the current temperature blending circuit 730 for different values $(a_1/a_0)_1$ to $(a_1/a_0)_5$ of the slope $a_1/a_0$ of the current $I_1(T)$ and different values $[-a_5/(a_2+a_4)]_1$ to $[-a_5/(a_2+a_4)]_5$ of the slope $[-a_5/(a_2+a_4)]$ of the current $I_2(T)$ in accordance with another aspect of the disclosure. This graph pertains to the case where the CTAT current generating circuit 720 is disabled for the $I_1(T)$ current and enabled for the $I_2(T)$ current (e.g., en_ctat1=0 and en_ctat2=1), and the currents $I_1(T)$ and $I_2(T)$ are given by Eqs. 1 and 4, respectively. As the graph illustrates, by programming different values for the scaling factors $a_0$-$a_5$, two sets of different slopes $(a_1/a_0)_1$ to $(a_1/a_0)_5$ and $[-a_5/(a_2+a_4)]_1$ to $[-a_5/(a_2+a_4)]_5$ for the currents $I_1(T)$ and $I_2(T)$ may be achieved, respectively. In this example, the sets of different slopes $(a_1/a_0)_1$ to $(a_1/a_0)_5$ and $[-a_5/(a_2+a_4)]_1$ to $[-a_5/(a_2+a_4)]_5$ are both in ascending order. As the current $I_{MIN}(T)$ is depicted in FIG. 8J, the current $I_{MIN}(T)$ is based on the current $I_1(T)$ over temperature range $T_A$ to $T_B$, and based on the current $I_2(T)$ over temperature range $T_B$ to $T_C$.

Similarly, it shall be understood that the other option of the CTAT current generating circuit 720 being enabled for the $I_1(T)$ current and disabled for the $I_2(T)$ current (e.g., en_ctat1=1 and en_ctat2=0) may be available. According to this option, the currents $I_1(T)$ and $I_2(T)$ are given by Eqs. 3 and 2, respectively.

Figure 9:
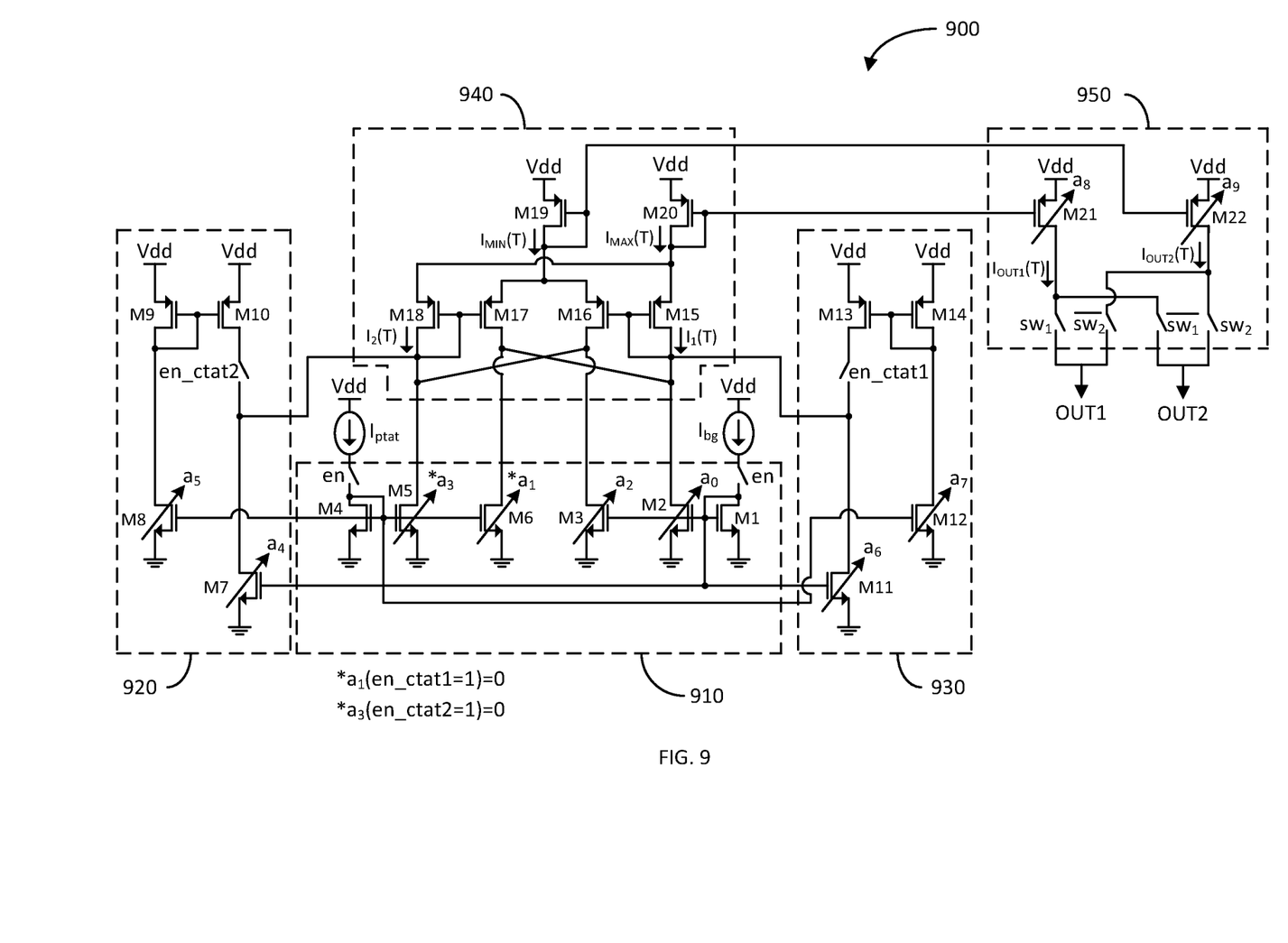
FIG. 9 illustrates a schematic diagram of an example bias current generator in accordance with the disclosure.

FIG. 9 illustrates a transistor-level schematic diagram of an example bias current generator 900 in accordance with another aspect of the disclosure. The bias current generator 900 may be an example implementation of the bias current generator 700 previously discussed. In particular, the bias current generator 900 includes an input current scaling circuit 910, an $I_2(T)$ CTAT current generating circuit 920, an $I_1(T)$ current generating circuit 930, a current temperature blending circuit 940, and an output current scaling and routing circuit 950. The bias current generator 900 may also include a bandgap current source $I_{bg}$ and a proportional to absolute temperature (PTAT) current source $I_{ptat}$.

The input current scaling circuit 910 includes n-channel metal oxide semiconductor (NMOS) FETs M1-M6. These transistors M1-M6 (and others described herein) are configured as current mirrors, and may be implemented in other current-mirror configurations, including those that have source resistors and/or select transistors. The bandgap current source $I_{bg}$ is coupled in series with a first enable switching device and the current mirror M1 between an upper voltage rail Vdd and a lower voltage rail (e.g., ground). As discussed with reference to bias current generator 700, the first enable switching device is responsive to an enable signal (en) to effectively enable and disable the bias current generator 900 (e.g., en=1, first switching device closed; en=0, first switching device open). The current mirror M1 includes a gate coupled to gates of the current mirrors M2 and M3. The current mirrors M2 and M3 include sources coupled to the lower voltage rail (e.g., ground).

The PTAT current source $I_{ptat}$ is coupled in series with a second enable switching device and the current mirror M4 between the upper voltage rail Vdd and the lower voltage rail (e.g., ground). Similarly, the second enable switching device is responsive to the enable signal (en) to effectively enable and disable the bias current generator 900 (e.g., en=1, second switching device closed; en=0, second switching device open). The current mirror M4 includes a gate coupled to gates of the current mirrors M5 and M6. The current mirrors M5 and M6 include sources coupled to the lower voltage rail (e.g., ground).

The $I_2(T)$ CTAT current generating circuit 920 includes NMOS FETs M7-M8 and p-channel metal oxide semiconductor (PMOS) FETs M9-M10. These transistors M7-M10 are also configured as current mirrors. The current mirror M9 is coupled in series with the current mirror M8 between the upper voltage rail Vdd and the lower voltage rail (e.g., ground). The current mirror M10 is coupled in series with a second CTAT enable switching device and the current mirror M7 between the upper voltage rail Vdd and the lower voltage rail (e.g., ground). The second CTAT enable switching device is responsive to a second CTAT enable signal (en_ctat2) to selectively enable the current $I_2(T)$ to have a negative slope (e.g., en_ctat2=1, $I_2(T)$ has a negative slope; en_ctat2=0, $I_2(T)$ does not have a negative slope). The current mirrors M9-M10 include gates coupled together, and to a drain of the current mirror M9. The current mirror M7 includes a gate coupled to the gates of current mirrors M1, M2, and M3 of the input current scaling circuit 910. The current mirror M8 includes a gate coupled to the gates of current mirrors M4, M5, and M6 of the input current scaling circuit 910.

The $I_1(T)$ CTAT current generating circuit 930, which may be optional, includes NMOS FETs M11-M12 and PMOS FETs M13-M14. These transistors M11-M14 are also configured as current mirrors. The current mirror M14 is coupled in series with the current mirror M12 between the upper voltage rail Vdd and the lower voltage rail (e.g., ground). The current mirror M13 is coupled in series with a first CTAT enable switching device and the current mirror M1*l* between the upper voltage rail Vdd and the lower voltage rail (e.g., ground). The first CTAT enable switching device is responsive to a first CTAT enable signal (en_ctat1) to selectively enable the current $I_1(T)$ to have a negative slope (e.g., en_ctat1=1, $I_1(T)$ has a negative slope; en_ctat1=0, $I_1(T)$ does not have a negative slope). The current mirrors M13-M14 include gates coupled together, and to a drain of the current mirror M14. The current mirror M11 includes a gate coupled to the gates of current mirrors M1, M2, and M3 of the input current scaling circuit 910. The current mirror M12 includes a gate coupled to the gates of current mirrors M4, M5, and M6 of the input current scaling circuit 910.

The current temperature blending circuit 940 includes PMOS FETs M15-M20. The transistors M19 and M20 are configured as current mirrors. The current mirror M19 is coupled between the upper voltage rail Vdd and sources of PMOS FETs M16 and M17. The current mirror M19 includes a gate coupled to its drain. The current mirror M20 is coupled between the upper voltage rail Vdd and sources of PMOS FETs M15 and M18. The current mirror M20 includes a gate coupled to its drain. The PMOS FET M15 includes a gate coupled to its drain, a gate of the PMOS FET M16, a drain of PMOS FET M17, drains of current mirrors M2 and M6 of the input current scaling circuit 910, and optionally to a drain of current mirror M11 of the $I_1(T)$ CTAT current generating circuit 930. The PMOS FET M18 includes a gate coupled to its drain, a gate of the PMOS FET M17, a drain of PMOS FET M16, drains of current mirrors M5 and M3 of the input current scaling circuit 910, and to a drain of current mirror M7 of the $I_2(T)$ CTAT current generating circuit 920.

The output current scaling and routing circuit 950 includes PMOS FETs M21 and M22. These transistors M21-M22 are configured as current mirrors. The current mirror M21 is coupled between the upper voltage rail Vdd and respective first terminals of a first set of complementary switches $sw_1$ and $\overline{sw_1}$. The current mirror M21 includes a gate coupled to the gate of current mirror M20 of the current temperature blending circuit 940. The first set of complementary switches $sw_1$ and $\overline{sw_1}$ include second terminals coupled to first and second output nodes OUT1 and OUT 2 of the bias current generator 900, respectively. The current mirror M22 is coupled between the upper voltage rail Vdd and respective first terminals of a second set of complementary switches $sw_2$ and $\overline{sw_2}$. The current mirror M22 includes a gate coupled to the gate of current mirror M19 of the current temperature blending circuit 940. The second set of complementary switches $sw_2$ and $\overline{sw_2}$ include second terminals coupled to the second and first output nodes OUT2 and OUT1 of the bias current generator 900, respectively.

The effective size or channel width W to channel L ratio (W/L) of the current mirrors M2, M3, M5, M6, M7, M8, M11, M12, M21, and M22 may be configured to effectuate the scaling factors $a_0$-$a_9$ as previously discussed with reference to bias current generator 700, respectively. This is typically effectuated by each of these current mirrors being a set of select transistors coupled in series with a set of W/L weighted transistors, respectively. The set of W/L weighted transistors may be equally weighted, binary weighted, or weighted in other manners. The corresponding scaling factor depends on the selected W/L weighted transistors via the set of select transistors, and the W/L weights of the selected W/L transistors, respectively. It shall be understood that the first and second CTAT enable switching devices may be incorporated into the sets of select transistors associated with current mirrors M11 and M7, respectively.

The operation of the bias current generator 900 is as follows: As discussed, the enable (en) signal being asserted causes the first and second switching devices to close; thereby coupling the bandgap current source $I_{bg}$ and the PTAT current source $I_{ptat}$ to the current mirrors M1 and M4, respectively. In the first part of the operational discussion, it is assumed that the $I_1(T)$ and $I_2(T)$ CTAT current generating circuits 930 and 920 are disabled by the first and second CTAT enable switching devices being open. Because of the current mirror configuration of the NMOS FETs M1-M3, the current through current mirror M2 is $a_0*I_{bg}$ and the current through current mirror M3 is $a_2*I_{bg}$. Similarly, because of the current mirror configuration of the NMOS FETs M4-M6, the current through current mirror M5 is $a_3*I_{ptat}$ and the current through current mirror M6 is $a_1*I_{ptat}$.

As the drains of current mirrors M2 and M6 are coupled together, the current $I_1(T)$ flowing to those nodes is the summation of the current $a_0*I_{bg}$ through current mirror M2 and the current $a_1*I_{ptat}$ through current mirror M6 (e.g., $I_1(T)=a_0*I_{bg}+a_1*I_{ptat}$ (Eq. 1)). Similarly, as the drains of current mirrors M3 and M5 are coupled together, the current $I_2(T)$ flowing to those nodes is the summation of the current $a_2*I_{bg}$ through current mirror M3 and the current $a_3*I_{ptat}$ through current mirror M5 (e.g., $I_2(T)=a_2*I_{bg}+a_3*I_{ptat}$ (Eq. 2)).

If the current $I_1(T)$ is greater than the current $I_2(T)$, the voltage at the gates of PMOS FETs M15 and M16 is less than the voltage at the gates of PMOS FETs M17 and M18. Thus, the PMOS FETs M15 and M16 are turned on more than the PMOS FETs M17 and M18. As the majority of the current $I_1(T)$ flows through PMOS FET M15 because it is turned on more than PMOS FET M17, the current $I_{MAX}(T)$ through current mirror M20 is based more on the current $I_1(T)$ than $I_2(T)$. Similarly, as the majority of the current $I_2(T)$ flows through PMOS FET M16 because it is turned on more than PMOS FET M18, the current $I_{MIN}(T)$ through current mirror M19 is based more on the current $I_2(T)$ than $I_1(T)$. Thus, the current temperature blending circuit 940 effectively outputs the larger current $I_1(T)$ as $I_{MAX}(T)$ and the smaller current $I_2(T)$ as $I_{MIN}(T)$.

Conversely, if the current $I_2(T)$ is greater than the current $I_1(T)$, the voltage at the gates of PMOS FETs M17 and M18 is less than the voltage at the gates of PMOS FETs M15 and M16. Thus, the PMOS FETs M17 and M18 are turned on more than the PMOS FETs M15 and M16. As the majority of the current $I_2(T)$ flows through PMOS FET M18 because it is turned on more than PMOS FET M16, the current $I_{MAX}(T)$ through current mirror M20 is based more on the current $I_2(T)$ than $I_1(T)$. Similarly, as the majority of the current $I_1(T)$ flows through PMOS FET M17 because it is turned on more than PMOS FET M15, the current $I_{MIN}(T)$ through current mirror M19 is based more on the current $I_1(T)$ than $I_2(T)$. Thus, the current temperature blending circuit 940 effectively outputs the larger current $I_2(T)$ as $I_{MAX}(T)$ and the smaller current $I_1(T)$ as $I_{MIN}(T)$.

Because of the current mirror configurations of PMOS FETs M20 and M21, a first output current $I_{OUT1}(T)$ through current mirror M21 is $a_8*I_{MAX}(T)$. Similarly, because of the current mirror configurations of PMOS FETs M19 and M22, a second output current $I_{OUT2}(T)$ through current mirror M22 is $a_9*I_{MAX}(T)$. The first and second output currents $I_{OUT1}(T)$ and $I_{OUT2}(T)$ may be selectively routed to output nodes $OUT_1$ and $OUT_2$. For example, if switching devices $sw_1$, $\overline{sw_1}$, $sw_2$ and $\overline{sw_2}$ are closed, open, closed, and open, respectively, the first output current $I_{OUT1}(T)$ is routed to the first output node OUT1 and the second output current $I_{OUT2}(T)$ is routed to the second output node OUT2. If switching devices $sw_1$, $\overline{sw_1}$, $sw_2$ and $\overline{sw_2}$ are open, closed, open, and closed, respectively, the first output current $I_{OUT1}(T)$ is routed to the second output node OUT2 and the second output current $I_{OUT2}(T)$ is routed to the first output node OUT1.

With regard to the $I_2(T)$ CTAT current generating circuit 920, it is enabled when the CTAT enable signal en_ctat2 is asserted (e.g., en_ctat2=1) to close the corresponding en_ctat2 switching device; thereby coupling the current mirror M10 to the current mirror M7. Further, when the $I_2(T)$ CTAT current generating circuit 920 is enabled, the scaling factor $a_3$ is equal to zero (0) so that substantially no current flows through current mirror M5. The $I_2(T)$ CTAT current generating circuit 920 operates as a current subtractor to generate a CTAT component of the second current $I_2(T)$ being equal to a difference of the current $a_4*I_{bg}$ through current mirror M7 and the current $a_5*I_{ptat}$ through current mirror M8. Accordingly, the current $I_2(T)$ is the sum of the current through the current mirror M3 $a_2*I_{bg}$ and the CTAT current $a_4*I_{bg} - a_5*I_{ptat}$ (e.g., $I_2(T)=a_2*I_{bg}+(a_4*I_{bg}-a_5*I_{ptat})$ (Eq. 4)). The remaining circuits 910, 940, and 950 operate the same as discussed above.

Similarly, with regard to the optional $I_1(T)$ CTAT current generating circuit 930, it is enabled when the CTAT enable signal en_ctat1 is asserted (e.g., en_ctat1=1) to close the corresponding en_ctat1 switching device; thereby coupling the current mirror M13 to the current mirror M11. Further, when the $I_1(T)$ CTAT current generating circuit 930, the scaling factor $a_1$ is equal to zero (0) so that substantially no current flows through current mirror M6. The $I_1(T)$ CTAT current generating circuit 930 operates as a current subtractor to generate a CTAT component of the first current $I_1(T)$ being equal to a difference of the current $a_6*I_{bg}$ through current mirror M1l and the current $a_7*I_{ptat}$ through current mirror M12. Accordingly, the current $I_1(T)$ is the sum of the current through the current mirror M2 $a_0*I_{bg}$ and the CTAT current $a_6*I_{bg}-a_7*I_{ptat}$ (e.g., $I_1(T)=a_0*I_{bg}+(a_6*I_{bg}-a_7*I_{ptat})$ (Eq. 3)). The remaining circuits 910, 940, and 950 operate the same as discussed above.

It shall be understood that both $I_1(T)$ and $I_2(T)$ CTAT current generating circuits 920 and 930 may be enabled at the same time. Further, for current density balancing purpose, the sum of the scaling factors $a_0$ and $a_1$ may be kept substantially constant. For example, if the application requires a relatively high scaling factor $a_0$ or $a_1$, then the reverse scaling factor $a_1$ or $a_0$ should be set such as $a_0+a_1$ is maintained at a substantially constant value.

Figure 10:
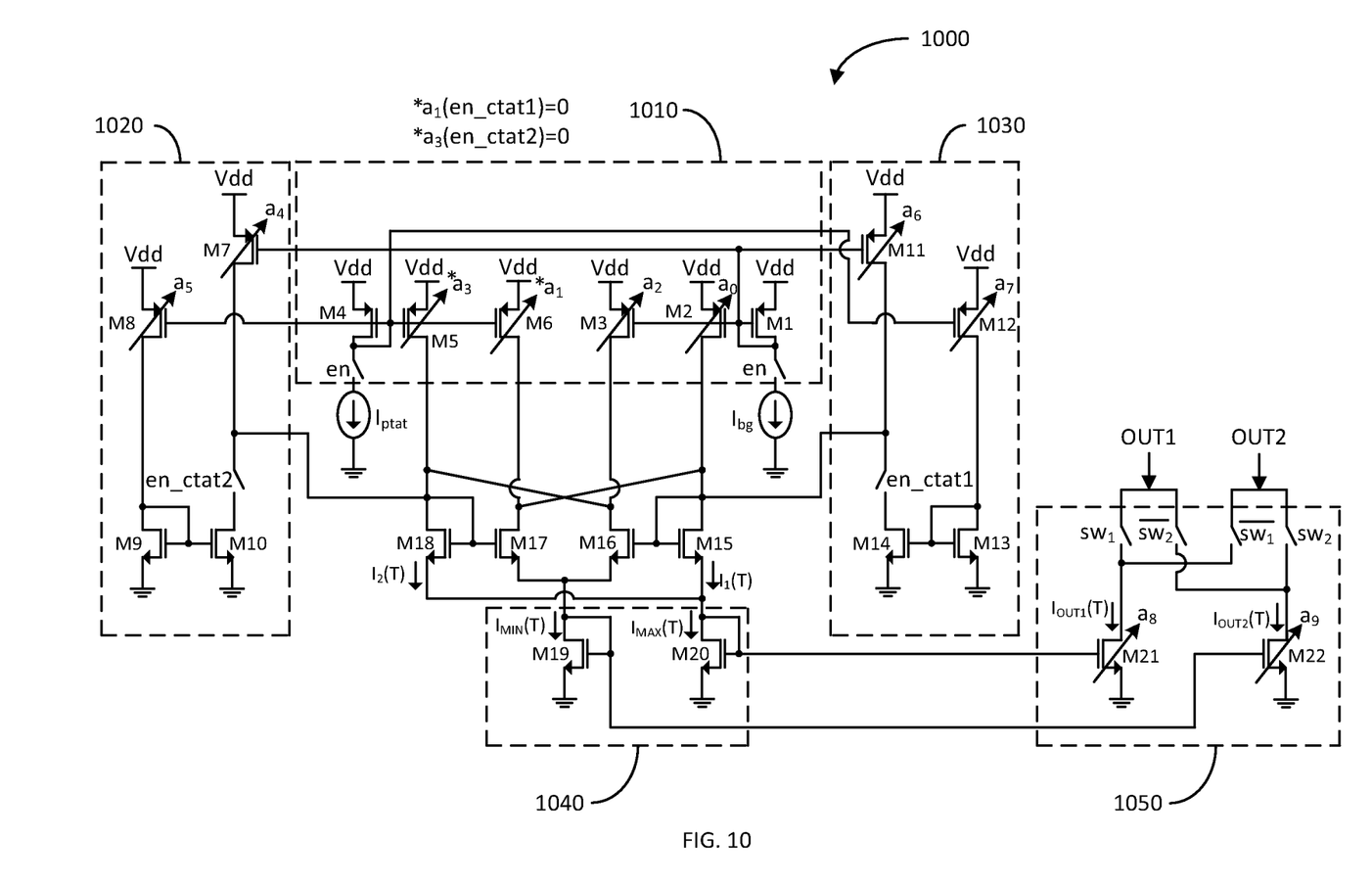
FIG. 10 illustrates a schematic diagram of another example bias current generator in accordance with the disclosure.

FIG. 10 illustrates a schematic diagram of another example bias current generator 1000 in accordance with the disclosure. The bias current generator 1000 is a complementary version of the bias current generator 900 previously discussed. That is, similarly-situated PMOS FETs and NMOS FETs in bias current generator 900 correspond to similarly-situated NMOS FETs and PMOS FETs in bias current generator 1000. Structurally, the bias current generator 1000 is also inverted as compared to that of bias current generator 900. The operation of the bias current generator 1000 is substantially the same as bias current generator 900. The description of the bias current generator 1000 is as follows:

The bias current generator 1000 includes an input current scaling circuit 1010, an $I_2(T)$ CTAT current generating circuit 1020, an optional $I_1(T)$ current generating circuit 1030, a current temperature blending circuit 1040, and an output current scaling and routing circuit 1050. The bias current generator 1000 may also include a bandgap current source $I_{bg}$ and a PTAT current source $I_{ptat}$.

The input current scaling circuit 1010 includes PMOS FETs M1-M6. Similarly, the PMOS FETs M1-M6 are configured as current mirrors. The current mirror M1 is coupled in series with the bandgap current source $I_{bg}$ and a first enable switching device between an upper voltage rail Vdd and a lower voltage rail (e.g., ground). As previously, the first enable switching device is responsive to an enable signal (en) to effectively enable and disable the bias current generator 1000 (e.g., en=1, first switching device closed; en=0, first switching device open). The current mirror M1 includes a gate coupled to gates of the current mirrors M2 and M3. The current mirrors M2 and M3 include sources coupled to the upper voltage rail Vdd.

The current mirror M4 is coupled in series with the PTAT current source $I_{ptat}$ and a second enable switching device between the upper voltage rail Vdd and the lower voltage rail (e.g., ground). Similarly, the second enable switching device is responsive to the enable signal (en) to effectively enable and disable the bias current generator 1000 (e.g., en=1, switching device closed; en=0, switching device open). The current mirror M4 includes a gate coupled to gates of the current mirrors M5 and M6. The current mirrors M5 and M6 include sources coupled to the upper voltage rail Vdd.

The $I_2(T)$ CTAT current generating circuit 1020 includes PMOS FETs M7-M8 and NMOS FETs M9-M10. These transistors M7-M10 are also configured as current mirrors. The current mirror M8 is coupled in series with the current mirror M9 between the upper voltage rail Vdd and the lower voltage rail (e.g., ground). The current mirror M7 is coupled in series with a second CTAT enable switching device and the current mirror M10 between the upper voltage rail Vdd and the lower voltage rail (e.g., ground). The second CTAT enable switching device is responsive to a second CTAT enable signal (en_ctat2) to selectively enable the current $I_2(T)$ to have a negative slope (e.g., en_ctat2=1, $I_2(T)$ has a negative slope; en_ctat2=0, $I_2(T)$ does not have a negative slope). The current mirrors M9-M10 include gates coupled together, and to a drain of the current mirror M9. The current mirror M7 has a gate coupled to the gates of current mirrors M1, M2, and M3 of the input current scaling circuit 1010. The current mirror M8 includes a gate coupled to the gates of current mirrors M4, M5, and M6 of the input current scaling circuit 1010.

The $I_1(T)$ CTAT current generating circuit 1030, which may be optional, includes PMOS FETs M11-M12 and NMOS FETs M13-M14. These transistors M7-M10 are also configured as current mirrors. The current mirror M12 is coupled in series with the current mirror M13 between the upper voltage rail Vdd and the lower voltage rail (e.g., ground). The current mirror M11 is coupled in series with a first CTAT enable switching device and the current mirror M14 between the upper voltage rail Vdd and the lower voltage rail (e.g., ground). The first CTAT enable switching device is responsive to a first CTAT enable signal (en_ctat1) to selectively enable the current $I_1(T)$ to have a negative slope (e.g., en_ctat1=1, $I_1(T)$ has a negative slope; en_ctat1=0, $I_1(T)$ does not have a negative slope). The current mirrors M13-M14 include gates coupled together, and to a drain of the current mirror M13. The current mirror M11 includes a gate coupled to the gates of current mirrors M1, M2, and M3 of the input current scaling circuit 1010. The current mirror M12 includes a gate coupled to the gates of current mirrors M4, M5, and M6 of the input current scaling circuit 1010.

The current temperature blending circuit 1040 includes NMOS FETs M15-M20. The transistors M19-M20 are configured as current mirrors. The current mirror M19 is coupled between sources of NMOS FETs M16 and M17 and the lower voltage rail (e.g., ground). The current mirror M19 includes a gate coupled to the its drain. The current mirror M20 is coupled between sources of NMOS FETs M15 and M18 and the lower voltage rail Vdd (e.g., ground). The current mirror M20 includes a gate coupled to its drain. The NMOS FET M15 includes a gate coupled to its drain, a gate of the NMOS FET M16, a drain of NMOS FET M17, drains of current mirrors M2 and M6 of the input current scaling circuit 1010, and optionally to a drain of current mirror M11 of the $I_1(T)$ CTAT current generating circuit 1030. The NMOS FET M18 includes a gate coupled to its drain, a gate of the NMOS FET M17, a drain of NMOS FET M16, drains of current mirrors M5 and M3 of the input current scaling circuit 1010, and to a drain of current mirror M7 of the $I_2(T)$ CTAT current generating circuit 1020.

The output current scaling and routing circuit 1050 includes a first set of complementary switches $sw_1$ and $\overline{sw_1}$ coupled in series with a current mirror (NMOS FET) M21 between first and second output nodes OUT1 and OUT2 and the lower voltage rail (e.g., ground), respectively. The output current scaling and routing circuit 1050 further includes a second set of complementary switches $sw_2$ and $\overline{sw_2}$ coupled in series with a current mirror (NMOS FET) M22 between the second and first output nodes OUT2 and OUT1 and the lower voltage rail (e.g., ground), respectively. The current mirror M21 includes a gate coupled to the gate of current mirror M20 of the current temperature blending circuit 1040. The current mirror M22 includes a gate coupled to the gate of current mirror M19 of the current temperature blending circuit 1040.

Figure 11:
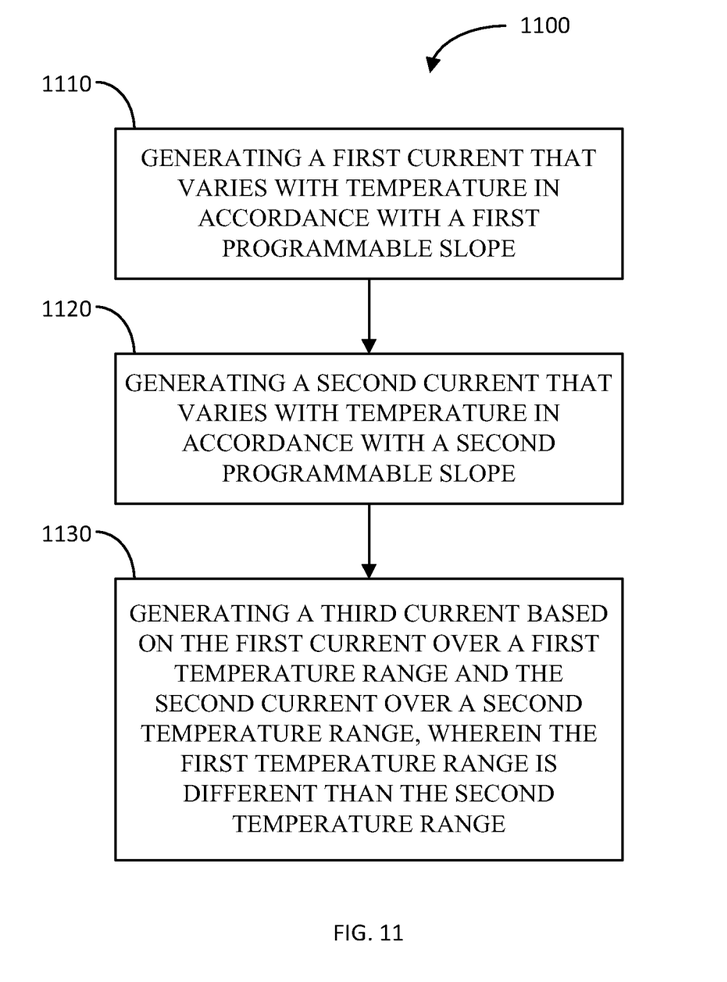
FIG. 11 illustrates a flow diagram of an example method of generating a temperature-dependent current in accordance with another aspect of the disclosure.

FIG. 11 illustrates a flow diagram of an example method 1100 of generating a temperature-dependent current in accordance with another aspect of the disclosure. The method 1100 includes generating a first current that varies with temperature in accordance with a first programmable slope (block 1110). Examples of means for generating a first current that varies with temperature in accordance with a first programmable slope include any of the input current scaling circuits described herein.

The method 1100 further includes generating a second current that varies with temperature in accordance with a second programmable slope (block 1120). Examples of means for generating a second current that varies with temperature in accordance with a second programmable slope include any of the input current scaling circuits described herein.

The method 1100 further includes generating a third current based on the first current over a first temperature range and the second current over a second temperature range, wherein the first temperature range is different than the second temperature range (block 1130). Examples of means for generating a third current based on the first current over a first temperature range and the second current over a second temperature range, wherein the first temperature range is different than the second temperature range include any of the current temperature blending circuits described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
   an input current scaling circuit configured to:
   generate a first current that varies with temperature in accordance with a first programmable slope; and
   generate a second current that varies with temperature in accordance with a second programmable slope; and
   a current temperature blending circuit configured to generate a third current based on the first current over a first temperature range and the second current over a second temperature range, wherein the first temperature range is different than the second temperature range.

2. The apparatus of claim 1, wherein the first programmable slope is a positive slope, and the second programmable slope is substantially zero.

3. The apparatus of claim 1, wherein the first programmable slope is a first positive slope, and the second programmable slope is a second positive slope, wherein the first positive slope is different than the second positive slope.

4. The apparatus of claim 1, wherein the first programmable slope is a negative slope, and the second programmable slope is substantially zero.

5. The apparatus of claim 1, wherein the first programmable slope is a first negative slope, and the second programmable slope is a second negative slope, wherein the first negative slope is different than the second negative slope.

6. The apparatus of claim 1, wherein the first programmable slope is a positive slope, and the second programmable slope is a negative slope.

7. The apparatus of claim 1, wherein the first current is based on a combination of a first scaling factor applied to a bandgap current and a second scaling factor applied to a proportional to absolute temperature (PTAT) current.

8. The apparatus of claim 7, wherein the first programmable slope is based on a ratio of the second scaling factor over the first scaling factor.

9. The apparatus of claim 7, wherein the second current is based on a combination of a third scaling factor applied to the bandgap current and a fourth scaling factor applied to the PTAT current.

10. The apparatus of claim 9, wherein the second programmable slope is based on a ratio of the fourth scaling factor over the third scaling factor.

11. The apparatus of claim 1, the input current scaling circuit comprises:
 a first current mirror configured to receive a bandgap current;
 a second current mirror coupled to the first current mirror, wherein the second current mirror is configured to generate a fourth current based on a first scaling factor applied to the bandgap current;
 a third current mirror coupled to the first current mirror, wherein the third current mirror is configured to generate a fifth current based on a second scaling factor applied to the bandgap current;
 a fourth current mirror configured to receive a proportional to absolute temperature (PTAT) current;
 a fifth current mirror coupled to the fourth current mirror, wherein the fifth current mirror is configured to generate a sixth current based on a third scaling factor applied to the PTAT current; and
 a sixth current mirror coupled to the fourth current mirror, wherein the sixth current mirror is configured to generate a seventh current based on a fourth scaling factor applied to the PTAT current, wherein the first current is based on the fourth and sixth currents, and the second current is based on the fifth and seventh currents.

12. The apparatus of claim 1, further comprising a first negative-slope current generating circuit coupled to the input current scaling circuit, wherein the first negative-slope current generating circuit is configured to cause the first programmable slope of the first current to be negative.

13. The apparatus of claim 12, wherein:
 the input current scaling circuit comprises:
  a first current mirror configured to receive a bandgap current; and
  a second current mirror configured to receive a proportional to absolute temperature (PTAT) current; and
 the first negative-slope current generating circuit comprises:
  a third current mirror coupled to the first current mirror, wherein the third current mirror is configured to generate a fourth current based on a first scaling factor applied to the bandgap current;
  a fourth current mirror coupled to the second current mirror, wherein the fourth transistor is configured to generate a fifth current based on a second scaling factor applied to the PTAT current, wherein the third and fourth current mirrors are coupled together to generate a sixth current based on a difference between the fourth current and the fifth current, and wherein the first current is based on the fifth current.

14. The apparatus of claim 12, further comprising a second negative-slope current generating circuit coupled to the input current scaling circuit, wherein the second negative-slope current generating circuit is configured to cause the second programmable slope of the second current to be negative.

15. The apparatus of claim 1, wherein the current temperature blending circuit is configured to generate the third current based on the first current in response to the first current being greater than the second current in the first temperature range, and generate the third current based on the second current in response to the second current being greater than the first current in the second temperature range.

16. The apparatus of claim 1, wherein the current temperature blending circuit is configured to generate the third current based on the first current in response to the first current being less than the second current in the first temperature range, and generate the third current based on the second current in response to the second current being less than the first current in the second temperature range.

17. The apparatus of claim 1, wherein the current temperature blending circuit comprises:
 first and second transistors are configured to substantially generate the first and second currents in response to the first current being greater than the second current, respectively;
 third and fourth transistors configured to substantially generate the first and second currents in response to the first current being less than the second current, respectively;
 a first current mirror coupled to the first and third transistors, wherein the first current mirror is configured to generate the third current based on the first current in response to the first current being greater than the second current, and based on the second current in response to the second current being greater than the first current; and
 a second current mirror coupled to the second and fourth transistors, wherein the second current mirror is configured to generate a fourth current based on the first current in response to the first current being less than the second current, and based on the second current in response to the second current being less than the first current.

18. The apparatus of claim 1, wherein the current temperature blending circuit is configured to:
 generate the third current based on the first current in response to the first current being greater than the second current in the first temperature range, and generate the third current based on the second current in response to the second current being greater than the first current in the second temperature range; and
 generate a fourth current based on the second current in response to the second current being less than the first current in the first temperature range, and generate the fourth current based on the first current in response to the first current being less than the second current in the second temperature range.

19. The apparatus of claim 18, further comprising an output current scaling circuit configured to:
 generate a first output current based on a first scaling factor applied to the third current; and
 generate a second output current based on a second scaling factor applied to the fourth current.

20. The apparatus of claim 18, further comprising an output current scaling and routing circuit configured to:

generate a first output current based on a first scaling factor applied to the third current;
generate a second output current based on a second scaling factor applied to the fourth current;
selectively route the first output current to a first or a second output node; and
selectively route the second output current to the second or the first output node.

21. A method, comprising:
generating a first current that varies with temperature in accordance with a first programmable slope;
generating a second current that varies with temperature in accordance with a second programmable slope; and
generating a third current based on the first current over a first temperature range and the second current over a second temperature range, wherein the first temperature range is different than the second temperature range.

22. The method of claim 21, wherein the first programmable slope is a first positive slope, and the second slope is a second positive slope or is substantially zero, wherein the first positive slope is different than the second positive slope.

23. The method of claim 21, wherein the first programmable slope is a first negative slope, and the second programmable slope is a second negative slope or is substantially zero, wherein the first negative slope is different than the second negative slope.

24. The method of claim 21, wherein the first slope is a negative slope, and the second slope is a positive slope.

25. The method of claim 21, wherein generating the third current comprises generating the third current based on the first current in response to the first current being greater than the second current in the first temperature range, and generating the third current based on the second current in response to the second current being greater than the first current in the second temperature range.

26. The method of claim 21, wherein generating the third current comprises generating the third current based on the first current in response to the first current being less than the second current in the first temperature range, and generating the third current based on the second current in response to the second current being less than the first current in the second temperature range.

27. An apparatus, comprising:
means for generating a first current that varies with temperature in accordance with a first programmable slope;
means for generating a second current that varies with temperature in accordance with a second programmable slope; and
means for generating a third current based on the first current over a first temperature range and the second current over a second temperature range, wherein the first temperature range is different than the second temperature range.

28. The apparatus of claim 27, wherein the first programmable slope is a first negative slope, and the second programmable slope is a second negative slope or is substantially zero, wherein the first negative slope is different than the second negative slope.

29. The apparatus of claim 27, wherein the means for generating the third current comprises means for generating the third current based on the first current in response to the first current being greater than the second current in the first temperature range, and means for generating the third current based on the second current in response to the second current being greater than the first current in the second temperature range.

30. The apparatus of claim 27, wherein the means for generating the third current comprises means for generating the third current based on the first current in response to the first current being less than the second current in the first temperature range, and means for generating the third current based on the second current in response to the second current being less than the first current in the second temperature range.

* * * * *